United States Patent [19]
Shinjo

[11] Patent Number: 5,522,129
[45] Date of Patent: Jun. 4, 1996

[54] APPARATUS FOR AUTOMATICALLY FIXING THE SELF-PIERCING NUTS

[75] Inventor: Hiroshi Shinjo, Osaka, Japan

[73] Assignee: Yugenkaisha Shinjo Seisakusho, Osaka, Japan

[21] Appl. No.: 386,673

[22] Filed: Feb. 10, 1995

[30] Foreign Application Priority Data

Feb. 20, 1994 [JP] Japan .................................. 6-037970

[51] Int. Cl.⁶ ........................................................ B23P 19/06
[52] U.S. Cl. ........................ 29/798; 29/34 B; 29/809; 29/818
[58] Field of Search ............................. 29/798, 818, 34 B, 29/243.53, 243.54, 281.1, 281.6, 809; 227/119, 147

[56] References Cited

U.S. PATENT DOCUMENTS

| | | | |
|---|---|---|---|
| 2,076,556 | 4/1937 | Gookin | 29/34 B |
| 4,164,072 | 8/1979 | Shinjo | 29/798 X |
| 4,242,793 | 1/1981 | Matthews et al. | 29/798 |
| 4,698,905 | 10/1987 | Taga | 29/798 |

FOREIGN PATENT DOCUMENTS 55-55935  12/1980  Japan .

Primary Examiner—Peter Vo
Assistant Examiner—Khan V. Nguyen
Attorney, Agent, or Firm—Antonelli, Terry, Stout & Kraus

[57] ABSTRACT

An apparatus for automatically causing the end face of a self-piercing nut (N) to function as a punch for piercing a metallic panel (P) laid on a caulking die (1) so that the nut is fixed to the panel. The apparatus has a pair of gripping fingers (31, 32) attached to the opposite sides of the lower end of a striking punch (2), and has a workpiece butting leg member (25) extending in parallel with a vertical bore (4) formed through a slide guide (3). The leg member (25) is attached to and depends from the bottom surface of the slide guide (3), so that the punch (2) holding the nut (N) by means of the gripping fingers (31, 32) will penetrate the slide guide (3) and then descend along the leg member (25), until the nut punches and is secured to the metal panel (P). Thus, the self-piecing nut (N) can be fixed to any bent bottom of or any narrow recess in the metal panel (P).

15 Claims, 4 Drawing Sheets

APPARATUS FOR AUTOMATICALLY FIXING THE SELF-PIERCING NUTS

BACKGROUND OF THE INVENTION

1. Field of the Invention

The present invention relates to an apparatus for automatically fixing self-piercing nuts onto a metallic panel, wherein each nut is caused to act as a pressing punch which itself can bite into the panel lying on a caulking die so as to become integral with the panel.

2. Prior Art

A prior art apparatus for automatically fixing the so-called self-piercing nuts onto a metallic panel is disclosed for example in the Japanese Utility Model Publication No. 55-55935 corresponding to U.S. Pat. No. 4,164,072. The apparatus comprises a caulking die for supporting the metallic panel, and a press ram holding and causing a punch to face the caulking die, by means of a connecting member. The apparatus further comprises a slide guide (a nut holding block) which has a vertical bore and a nut feeding aperture extending perpendicular thereto, wherein the punch can slide up and down through the vertical bore. A flexible chute connected to the slide guide communicates with the nut feeding aperture. A guide post also incorporated in the apparatus is designed such that the slide guide can vertically be displaced relative to the connecting member between an upper limit and a lower limit. A spring is employed to urge the guide post downwardly, so that the self-piecing nut which will have entered the vertical bore through the feeding aperture is struck by the punch, whereby the nut bites or punches and is secured to the metallic panel.

Usually, the apparatus for automatically fixing the self-piercing nuts is incorporated and used in a pressing machine comprising other pressing dies or tools. The nuts are not necessarily fixed only to a plane portion of a metal panel, but sometimes are fixed to bottoms defining the bent or drawn portions of an L-shape, U-shape or the like shape. In the latter case, the punch must reciprocate a longer distance, so that the slide guide is occasionally elongated to provide a nose piece.

However, such a longer slide guide inevitably causes the punch and the guide post to make a longer vertical stroke. In a case wherein the nut fixing apparatus coexists with the other dies in the same pressing machine, the flexible chute supplying the nuts to the slide guide must be arranged not to interfere with the other dies. In consequence, such a limited layout space for the flexible chute will likely impart a twisting and/or bending stress to the slide guide and/or the guide post. Thus, the longer the vertical stroke of the post and the guide, the less smoothly they reciprocate in vertical direction.

Further, the prior art nut fixing apparatuses are designed such that each self-piecing nut is struck to a metal plate or panel when an end face of the slide guide is in a direct contact with the panel. Therefore, the slide guide sometimes interferes with the metal panel at portions thereof located proximate a bent bottom or around a recess narrower than said guide, thereby failing to fix the nut to the metal panel.

SUMMARY OF THE INVENTION

An object of the present invention is therefore to resolve those problems inherent in the prior art apparatuses, and more particularly to provide a novel apparatus that can automatically fix the self-piercing nuts even to any bent and deep bottom or a narrow recess formed in a metallic panel.

The apparatus of the invention attains this object and is designed for automatically fixing the self-piercing nuts onto a metallic panel as a workpiece comprises a caulking die for supporting the metallic panel, a striking punch connected by a connecting member to a press ram so as to face the caulking die, a slide guide having a vertical bore and a nut feeding aperture extending perpendicular thereto, the striking punch being capable of sliding up and down through the vertical bore, a flexible chute connected to the slide guide and communicating with the nut feeding aperture, and a supporting device for holding and allowing the slide guide to slide up and down a vertical distance relative to the connecting member, the supporting device biasing the slide guide downwardly by a spring means such that the self-piercing nut having entered the vertical bore through the feeding aperture is struck by the punch so as to bite or punch and be secured to the metallic panel. Further, the apparatus characteristically comprises a pair of gripping fingers attached to opposite sides of a lower end of the striking punch, and a workpiece butting leg member extending in parallel with the vertical bore and attached to a bottom surface of the slide guide, so that the striking punch holding in place the nut by means of the gripping fingers will penetrate the slide guide and then descend along the leg member until the nut punches and is secured to the metallic panel as the workpiece.

Preferably, a stopper is attached to a distal side of the lower end of the striking punch in such a state that the self-piercing nut gripped with the fingers can take a regular position, when it enters the vertical bore. It is also preferable that leg member pending from the slide guide regulates the position of the nuts gripped with the fingers, while the striking punch descends. Side walls of the vertical bore formed through the slide guide may have bearing members which are in an effective rolling contact with opposite sides of the striking punch.

The supporting device for supporting the descendable slide guide may comprise an upright guide post, a guide sleeve and a coiled spring. The guide post is secured to the slide guide so as to extend in parallel with the striking punch. The guide sleeve secured to the connecting member and fitting on the guide post allows the guide post to move axially of said guide sleeve. The coiled spring loosely fits on the guide post and guide sleeve so as to bias the slide guide downwardly. A further bearing member may desirably be disposed between the sliding contact surfaces of the guide post and guide sleeve.

In operation of the apparatus summarized above, the workpiece butting leg member will stand still after being brought into contact with the metal panel lying on the caulking die. The striking punch having their fingers gripping the self-piercing nut will then rush through the slide guide, along the leg member and towards the metal panel. Thus, a lower face of the nut functions as a kind of punching die that bites the panel and removes a small piece out of the panel, to thereby form a round hole therethrough, and at the same time the caulking die will plastically and forcibly deform a periphery around the hole of the panel to irremovably seize the self-piercing nut. During this process, the workpiece butting leg member will operate to regulate the position of the nut gripped by the fingers and cause it to pierce a correct portion in the metal panel. The leg member may preferably be of the same width as the striking punch and of an appropriate length so that the nut can be fixed to any bent bottom or any narrow recess in the metal panel.

BRIEF DESCRIPTION OF THE DRAWINGS

FIGS. 3(a) to 3(c) show a striking punch incorporated in the apparatus, in which;

FIG. 3(a) is a left side elevation of the punch;

FIG. 3(b) is similarly a right side elevation of the punch; and

FIG. 3(c) is a bottom view of the punch;

DETAILED DESCRIPTION OF THE PREFERRED EMBODIMENTS

Figure 1:
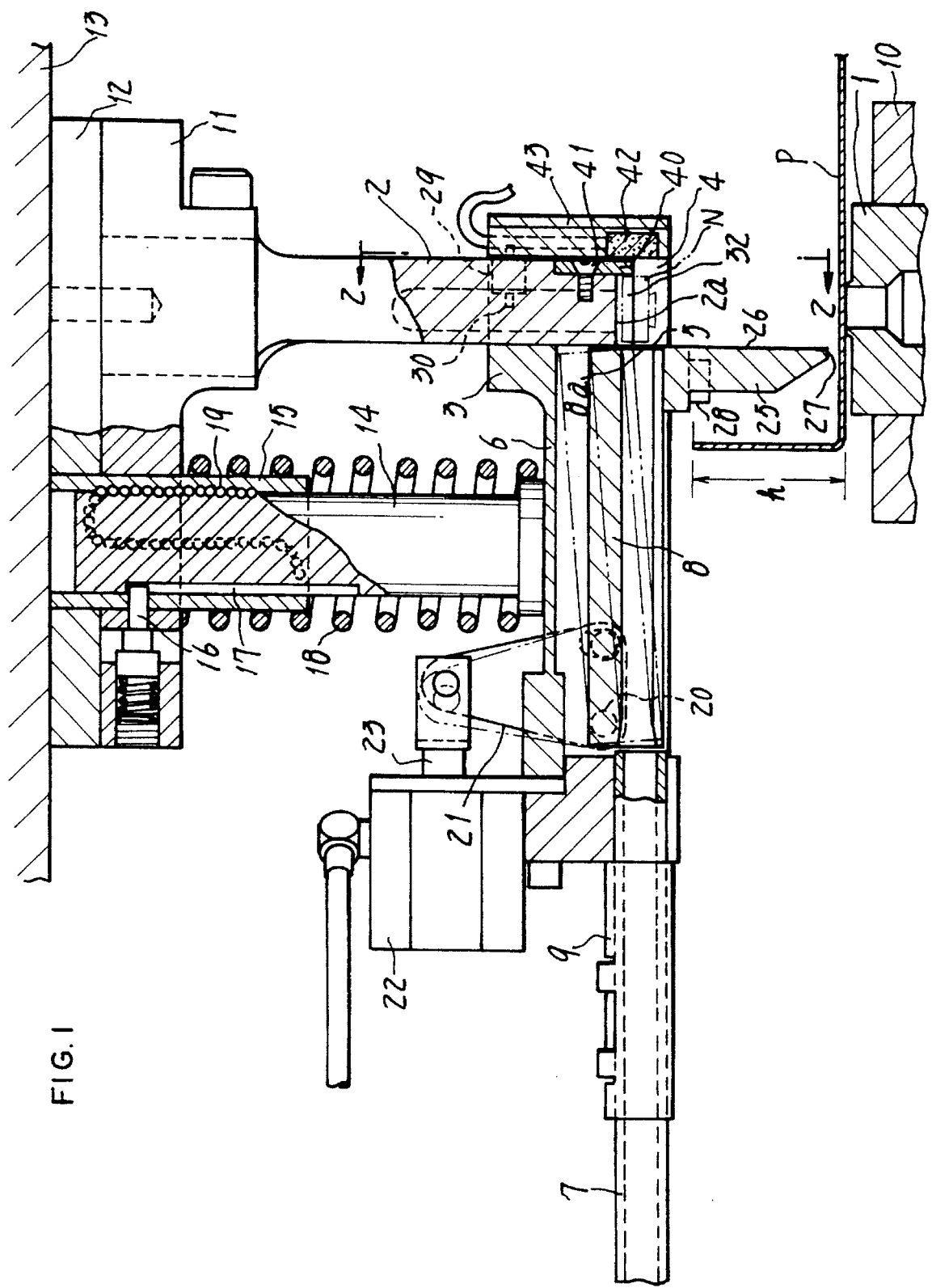
FIG. 1 is a front elevation of an apparatus for fixing the self-piercing nut, the apparatus being provided by the invention and shown partly in cross section.

Now, some embodiments of the present invention will be described referring to the drawings.

FIG. 1 illustrates an apparatus provided herein for automatically fixing the so-called self-piercing nuts to a metallic panel 'P'. This apparatus cooperates with a caulking die 1 on which the panel 'P' is laid, and comprises a striking punch 2 capable of being disposed to face the caulking die 1. A slide guide 3 has a vertical bore 4 formed therethrough and a nut feeding aperture 5 extending perpendicular to the bore, wherein the striking punch 2 slidably reciprocate up and down through the bore 4. Formed integral with the slide guide 3 is a rigid frame 6 arch-shaped in cross section. A distal end of the rigid frame 6 communicates with the nut feeding aperture 5, with a proximal end of the frame being connected by a fitting 9 to a flexible chute 7. A movable chute 8 is accommodated in the rigid frame 6 so that a series of the self-piercing nuts (hereinafter simply referred to as 'nuts') 'N' are transferred one by one from the flexible chute 7 to the vertical bore 4, through a distal opening 8a of the movable chute and the aperture 5.

A die holder 10 carrying the caulking die 1 is fixed to a bolster (not shown) of a pressing machine, together with other lower dies. A punch holder (as the connecting member) 11 to which the striking punch 2 is secured is attached to a back-up plate 12, which in turn is fixed to a press ram 13, together with other upper dies (not shown). The striking punch can thus reciprocate up and down accompanying the press ram 13.

The slide guide 3 fits on the striking punch 2 so that the latter is received through the vertical bore 4 of the guide. On the other hand, a guide post 14 integral with the rigid frame 3 stands upright in parallel with the punch 2. A guide sleeve 15 integral with the punch holder 11 fits on and allows the guide post 14 to slide up and down. Therefore, the slide guide 3 and the rigid frame 6 are movable vertically relative to the striking punch 2. A pin 16 attached to the punch holder 11 engages with an axial groove 17 formed in a side wall surface of the guide post 14, thereby defining an upper and lower limits for reciprocation of the guide post. A coiled spring 18 loosely fitting on the guide post 14 and the guide sleeve 15 urges downwards the slide guide 3 together with the rigid frame 6, so as to cause them to take a lowermost position shown in FIG. 1. A number of small rolling members (viz. balls) 19 circulate through a narrow gap present between the guide post 14 and the guide sleeve 15, thus forming the so-called 'ball-spline'. Such a bearing structure ensures a smooth vertical reciprocation of the guide post 14, in spite of a possible twisting and/or bending stress to a certain degree is imparted thereto.

The proximal end of the movable chute 8 is pivoted by a pin 20 to the rigid frame 6. A bracket 21 is connected at its bottom to opposite ends of the pin 20, and at its top connected to a rod 23 of a pneumatic cylinder 22. This cylinder drives the distal opening 8a of the movable chute to be displaced a little vertical distance. With the movable chute 8 being held at a horizontal position shown with the solid lines in FIG. 1, the nuts 'N' transferred from the flexible chute 7 will be delivered to the vertical bore 4, through the opening 8a and the nut feeding aperture 5. On the other hand, when the opening 8a is raised to take its upper position indicated by the phantom lines in FIG. 1, the opening 8a will be closed in part by a proximal wall surface of the striking punch 2, thereby interrupting the feeding of nuts. Such a vertical displacement of the movable chute 8 driven by the pneumatic cylinder 22 will repeat in response to the vertical reciprocation of the press ram 13, so that the nuts 'N' is supplied one by one to the vertical bore 4 in the slide guide 3. It is possible that some apparatuses each of the described structure are mounted on the same pressing machine, and one or more of them temporarily rest inoperative. Some or all of those apparatuses may also be kept inoperative when the work to change the dies or to align them with the cooperative dies is carried out. In those occasions, the cylinder 22 may be operated solely and independently of the vertically reciprocating press ram 13, such that the distal opening 8a of the movable chute 8 is maintained at it upper position to temporarily stop the feeding of the nuts 'N'.

A workpiece butting leg member 25 fixed to a bottom of the slide guide 3 protrudes downward therefrom in parallel with the vertical bore 4. The leg member 25 has a flat distal side 26 of approximately the same width as the striking punch 2 (see FIG. 2). The distal side 26 extends in a plane in which the aperture 5 and the proximal wall surface of the bore 4 lie, so that the nut 'N' gripped by the punch 2 penetrating the bore through the slide guide 3 is guided until rigidly fixed on the metal panel 'P'. A proximal side of the leg member has an obliquely cut lower portion to provide a narrow bottom 27. The height of the leg member 25 corresponds to the height 'h' of an L-shaped bent portion of the panel (viz. workpiece). Set screws 28 detachably attach this workpiece butting member 25 so that it can be replaced with another one to match any change in the height of said bent portion.

However, the striking punch 2 inserted in the bore 4 of slide guide 3 is of a sufficient length such that the punch moving down along the leg member can reach the narrow bottom 27 thereof to strike and fix the nut 'N' onto the panel. Disposed near an upper opening of the vertical bore 4 are a pair of rollers 29 each rotatable around a horizontal shaft 30 integral with the slide guide 3 (see FIG. 2). Opposite sides of the striking punch 2 are in a rolling contact with those rollers 30, whereby the slide guide can easily and smoothly move up and down relative to the punch.

Figure 2:
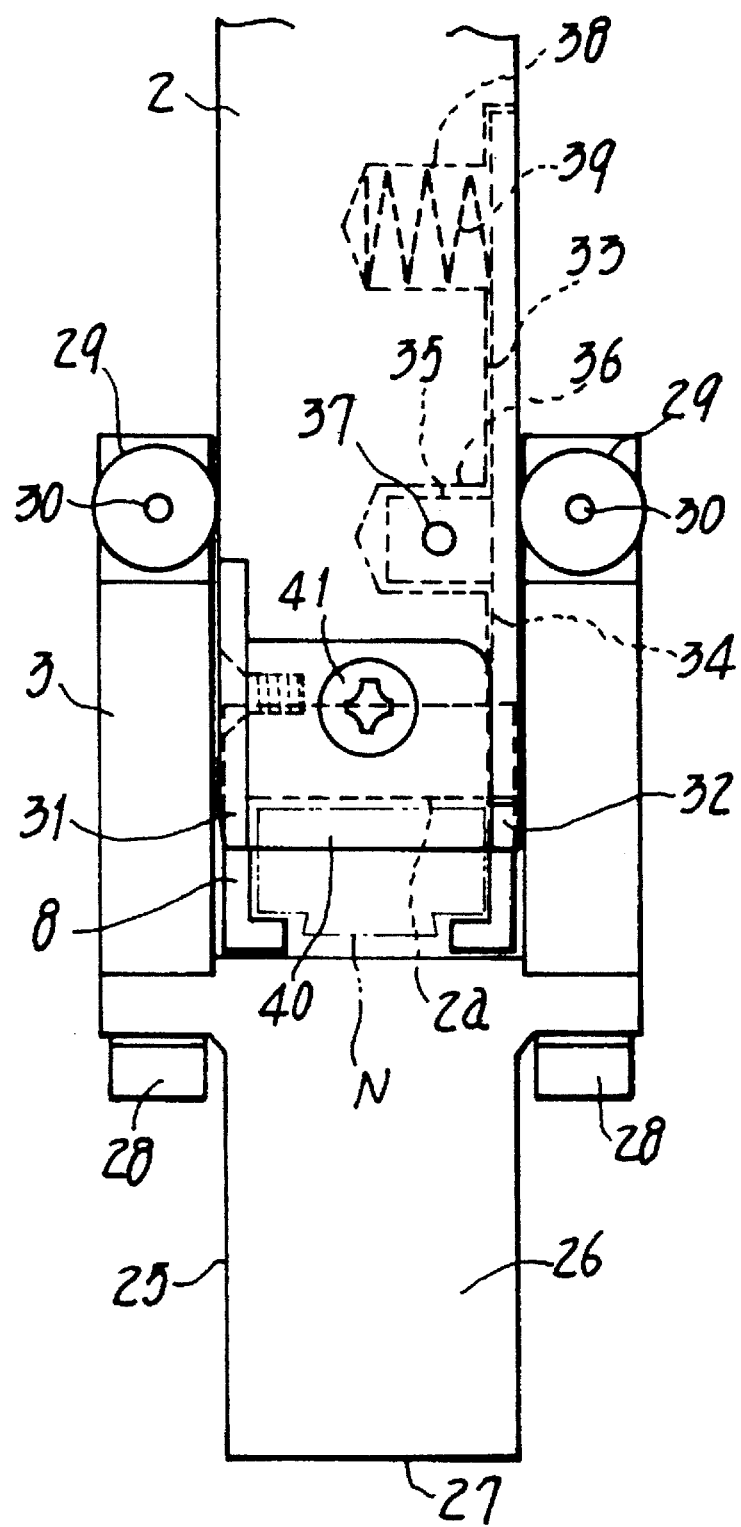
FIG. 2 is a cross section taken along the line 2—2 in FIG. 1.
Figure 3:
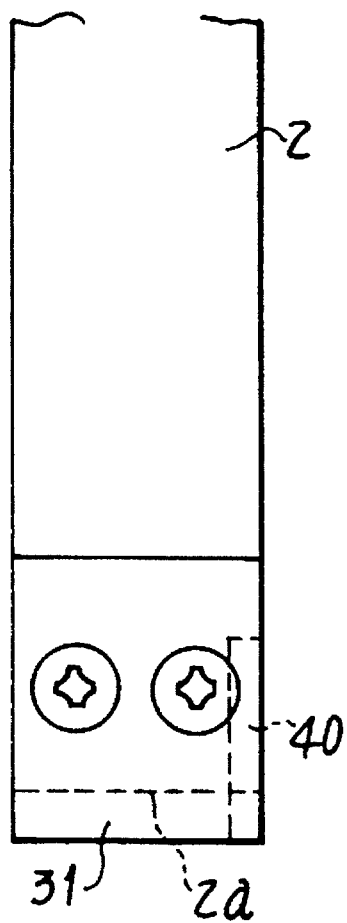
Figure 3:
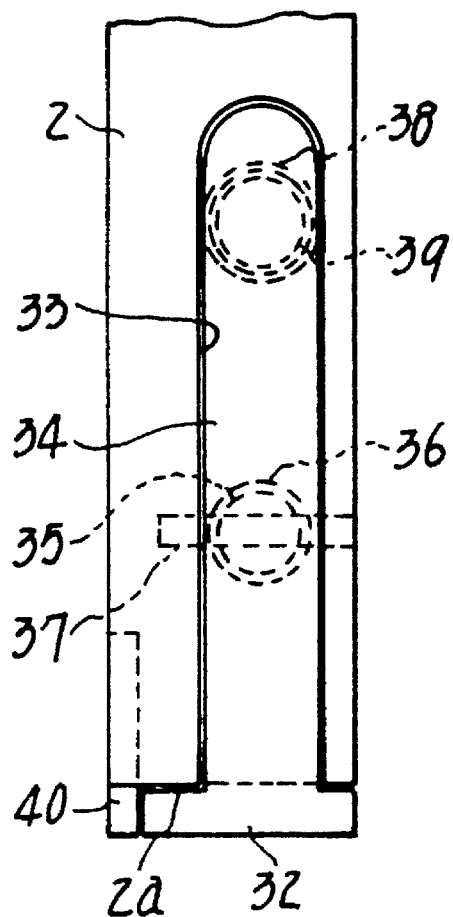
Figure 3:
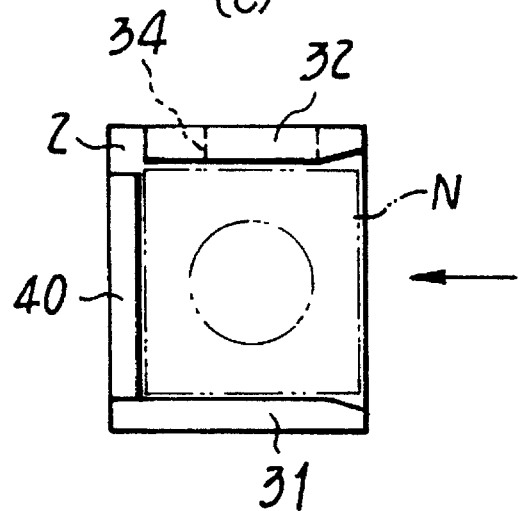

As shown in FIGS. 2 and 3, a pair of gripping fingers 31 and 32 are attached to opposite sides of a lower portion of the punch 2. One of the fingers 31 is fixed to one side of the punch and extends downwards beyond a bottom face 2a thereof. The other finger 32 is a swingable finger integral with a bottom of a rockable base plate 34, which fits in an elongate groove 33 formed in and longitudinally of the other side of the striking punch. A boss 35 protruding from an intermediate portion of the rockable base plate engages with a pit 36 and is pivoted there by a pin 37 to the other side of the punch. The latter finger 32 having also a lower end downwardly protruding out of the bottom face 2a of said punch is urged towards the former finger 31, because a compressed spring 39 received in another pit 38 formed in an upper region of the elongate groove 33 urges outwards the base plate. A stopper 40 for regulating the position of the nut 'N' gripped by the fingers 31 and 32 is fixed to a distal side of the lower portion of the punch 2, and located adjacent to said fingers. The stopper 40 is made of an insulating material such as FRP (viz. fiber-reinforced plastics), ceramics or the like so as not to disturb the function of a nut sensing head 42 detailed below. The stopper 40 fastened by a screw 41 to the striking punch 2 also has a lower end protruding beyond the bottom face 2a of the punch.

The nut sensing head 42, which is a proximity detector embedded in a side cap 43 closing the slide guide 3, judges if the nut 'N' delivered to the vertical bore 2 is at a position proximate the bottom face 2a of the striking punch 2. Upon detection of the nut having approached the bottom face, an electric signal will be transmitted to a controller so as to actuate the press ram 13.

Figure 4:
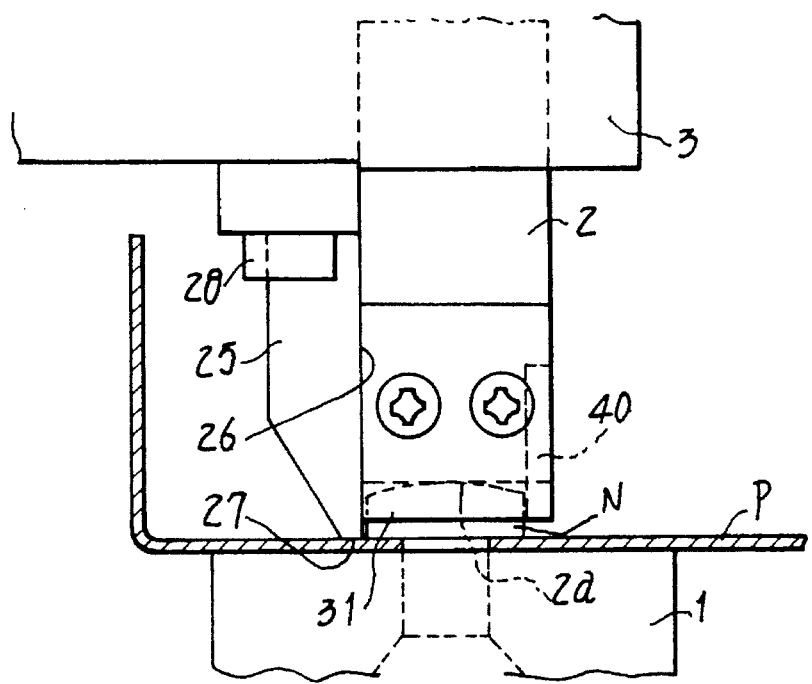
FIG. 4 is an enlarged front elevation of the apparatus in an exemplary use thereof to strike and fix the nut to a metal panel.
Figure 5:
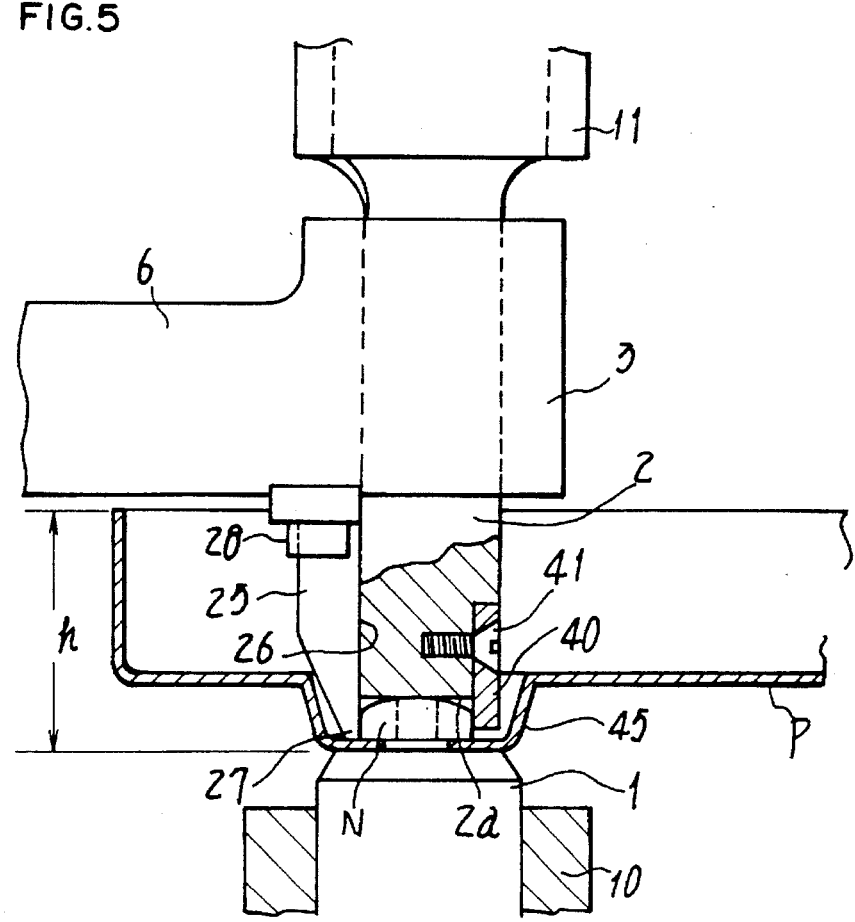
FIG. 5 is a front elevation corresponding to FIG. 4 and illustrating the apparatus in another use and partly in cross section.

In operation as best seen in FIG. 1, as the nut 'N' arrives at the position proximate and below the bottom face 2a of the punch, the fingers 31 and 32 will grip the nut at opposite sides thereof. The stopper 40 will simultaneously regulates the position of this nut relative to the punch. Subsequently, the press ram 13 descends to lower the striking punch 2 and the slide guide 3. The narrow bottom 27 of the workpiece butting leg member 25 will thus bear against the metal panel (viz. workpiece) 'P' and stop. However, the striking punch 2 continues to descend through the vertical bore 4 of the slide guide 3 and along the distal side 26 of the leg member 25, while compressing the coiled spring 18. The distal side 26 will protect the nut 'N', which is gripped by the fingers and descending, from undesirably changing its position. The punch 2 will further descend until the nut 'N' collides with and is secured to the panel 'P' as shown in FIG. 4. When the nut pierces the panel in this manner, a lower face of the nut 'N' will function as a punching die that bites the panel and removes a small piece therefrom to form a round hole. Simultaneously, the caulking die will caulk a periphery around the hole in the panel 'P' to irremovably seize the nut. Even if the L-shaped panel (viz. workpiece) 'P' having a narrow recess 45 formed therein is concerned, the apparatus can rigidly secure the nut 'N' thereto as shown in FIG. 5, provided that there is a space for receiving the punch 2 and the leg member 25.

In summary, the apparatus comprises the pair of gripping fingers 31 and 32 attached to the opposite sides of the lower end of the striking punch 2, and the workpiece butting leg member 25 extending in parallel with the vertical bore 4 and attached to the bottom surface of the slide guide 3. Therefore, the punch 2 holding the nut 'N' by means of the gripping fingers will penetrate the slide guide 3 and then descend along the leg member 25, until the nut punches and is secured to the metal panel 'P'. Thus, the self-piecing nut can be fixed to any bent bottom of or any narrow recess in the metal panel. The structure of the striking punch 2, leg member 25 and finger 31 and 32 is effective to hold at a correct position the nut 'N' gripped between the fingers so that the punch advancing through the slide guide can strike and fix the nut to the panel exactly and surely.

The other structure of the striking punch 2, slide guide 3, vertical bore 4, bearing member 19 disposed between sliding contact surfaces of the guide post 14 and guide sleeve 15 and bearing members 29 affords a smooth vertical movement of the slide guide and the guide post. Therefore, even the longer stroke of the striking punch will not adversely affect the nut fixing operation thereof.

What is claimed is:

1. An apparatus for automatically fixing self-piercing nuts onto a metallic panel, the apparatus comprising:

a caulking die for supporting the metallic panel;

a striking punch connected by a connecting member to a press ram so as to face the caulking die;

a slide guide having a vertical bore and a nut feeding aperture extending perpendicular thereto;

the striking punch for sliding up and down through the vertical bore;

a flexible chute connected to the slide guide and communicating with the nut feeding aperture;

a supporting device for holding and allowing the slide guide to slide up and down a vertical distance relative to the connecting member;

the supporting device biasing the slide guide downwardly by a spring such that the self-piercing nut having entered the vertical bore through the feeding aperture is struck by the punch so as to bite or punch and be secured to the metallic panel;

a pair of gripping fingers attached to opposite sides of a lower end of the striking punch;

a workpiece butting leg member extending in parallel with the vertical bore and attached to a bottom surface of the slide guide, so that the striking punch holding in place the nut by means of the gripping fingers will penetrate the slide guide and then descend along the leg member until the nut is punched and secured to the metallic panel; and a stopper attached to a distal side of the lower end of the striking punch in such a state that a self-piercing nut gripped with the fingers can take a position.

2. An apparatus as defined in claim 1, wherein one of the fingers is a fixed finger and the other finger is a swingable finger urged by a spring towards the fixed finger.

3. An apparatus as defined in claim 1 or 9 wherein the leg member is of a same width as the striking punch so as to regulate a position of the nut gripped with the fingers, while the striking punch descends.

4. An apparatus as defined in claim 1 wherein side walls of the vertical bore formed through the slide guide have bearing members which are in a rolling contact with opposite sides of the striking punch.

5. An apparatus as defined in claim 2 wherein side walls of the vertical bore formed through the slide guide have bearing members which are in a rolling contact with opposite sides of the striking punch.

6. An apparatus in accordance with claim 1 wherein:

the supporting device for supporting the slide guide comprises an upright guide post, a guide sleeve and a coiled spring, and wherein the guide post is secured to the slide guide so as to extend in parallel with the striking punch, the guide sleeve is secured to a connecting member and fitting on the guide post allowing the guide post to move axially with respect to the guide sleeve, and the coiled spring fits on the guide post and guide sleeve so as to bias the slide guide downwardly.

7. An apparatus in accordance with claim 2 wherein:

the supporting device for supporting the slide guide comprises an upright guide post, a guide sleeve and a coiled spring, and wherein the guide post is secured to the slide guide so as to extend in parallel with the striking punch, the guide sleeve is secured to a connecting member and fitting on the guide post allowing the guide post to move axially with respect to the guide sleeve, and the coiled spring fits on the guide post and guide sleeve so as to bias the slide guide downwardly.

8. An apparatus in accordance with claim 4 wherein:

the supporting device for supporting the slide guide comprises an upright guide post, a guide sleeve and a coiled spring, and wherein the guide post is secured to the slide guide so as to extend in parallel with the striking punch, the guide sleeve is secured to a connecting member and fitting on the guide post allowing the guide post to move axially with respect to the guide sleeve, and the coiled spring fits on the guide post and guide sleeve so as to bias the slide guide downwardly.

9. An apparatus in accordance with claim 5 wherein:

the supporting device for supporting the slide guide comprises an upright guide post, a guide sleeve and a coiled spring, and wherein the guide post is secured to the slide guide so as to extend in parallel with the striking punch, the guide sleeve is secured to a connecting member and fitting on the guide post allowing the guide post to move axially with respect to the guide sleeve, and the coiled spring fits on the guide post and guide sleeve so as to bias the slide guide downwardly.

10. An apparatus in accordance with claim 6 further comprising:

a further bearing member disposed between sliding contact surfaces of the guide post and the guide sleeve.

11. An apparatus in accordance with claim 14 further comprising:

a further bearing member disposed between sliding contact surfaces of the guide post and the guide sleeve.

12. An apparatus in accordance with claim 15 further comprising:

a further bearing member disposed between sliding contact surfaces of the guide post and the guide sleeve.

13. An apparatus in accordance with claim 17 further comprising:

a further bearing member disposed between sliding contact surfaces of the guide post and the guide sleeve.

14. An apparatus for automatically fixing self-piercing nuts onto a metallic panel, the apparatus comprising:

a caulking die for supporting the metallic panel;

a striking punch connected by a connecting member to a press ram so as to face the caulking die;

a slide guide having a vertical bore and a nut feeding aperture extending perpendicular thereto;

the striking punch for sliding up and down through the vertical bore;

a flexible chute connected to the slide guide and communicating with the nut feeding aperture;

a supporting device for holding and allowing the slide guide to slide up and down a vertical distance relative to the connecting member;

the supporting device biasing the slide guide downwardly by a spring such that the self-piercing nut having entered the vertical bore through the feeding aperture is struck by the punch so as to bite or punch and be secured to the metallic panel;

a pair of gripping fingers attached to opposite sides of a lower end of the striking punch;

a workpiece butting leg member extending in parallel with the vertical bore and attached to a bottom surface of the slide guide, so that the striking punch holding in place the nut by means of the gripping fingers will penetrate the slide guide and then descend along the leg member until the nut is punched and secured to the metallic panel; and wherein the supporting device for supporting the slide guide comprises an upright guide post, a guide sleeve and a coiled spring, and wherein the guide post is secured to the slide guide so as to extend in parallel with the striking punch, the guide sleeve is secured to a connecting member and fitting on the guide post allowing the guide post to move axially with respect to the guide sleeve, and the coiled spring fits on the guide post and guide sleeve so as to bias the slide guide downwardly.

15. An apparatus in accordance with claim 14 further comprising:

a further bearing member disposed between sliding contact surfaces of the guide post and the guide sleeve.

* * * * *